May 8, 1928. 1,669,186

F. S. BUNKER

SELF LOCKING DEVICE FOR COUPLINGS

Filed Oct. 4, 1923

INVENTOR.
Frank S. Bunker
BY
Munn & Co.
ATTORNEY.

Patented May 8, 1928.

1,669,186

UNITED STATES PATENT OFFICE.

FRANK SUMNER BUNKER, OF LONG BEACH, CALIFORNIA.

SELF-LOCKING DEVICE FOR COUPLINGS.

Application filed October 4, 1923. Serial No. 666,592.

My invention relates to couplings for pipes, rods or any two elements which are adapted to be removably secured in end to end relation.

It is a purpose of my invention to provide a simple and inexpensive locking device by means of which a coupling of the above described character can be securely locked againts uncoupling so as to positively maintain the two sections of pipe or rod in coupled position, yet at the same time permitting uncoupling of the pipe or rod sections when desired by the use of a suitable key or tool.

My invention is particularly adapted, although not necessarily, for use in connection with drilling tool joints, either standard cable tools or rotary tool joints, drill tubings, production string and the like, where it is necessary that the joints be locked against uncoupling in order that the sections of tools or tubing remain connected during the drilling operation and while removing the same from the well. In either of these operations, it frequently occurs that owing to reverse twisting or rotation of the tubing or cable, the movement operates to uncouple the sections, resulting in the loss of the sections and tools in the well. My invention prevents such an occurrence by effecting a positive locking of the couplings or joints.

I will describe only two forms of locking devices embodying my invention and will then point out the novel features thereof in claims.

Figure 1:
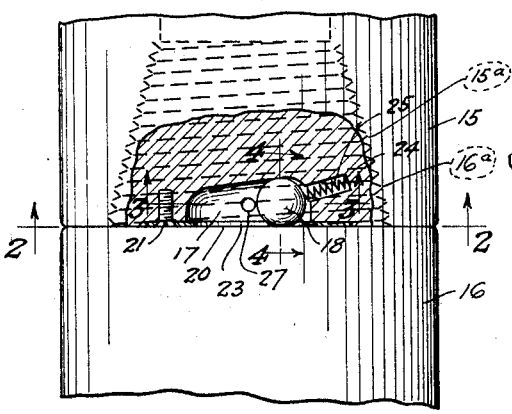
Figure 1 is a view having portions broken away, showing a conventional form of pipe or tube coupling or joints having applied thereto one form of locking device embodying my invention.
Figure 2:
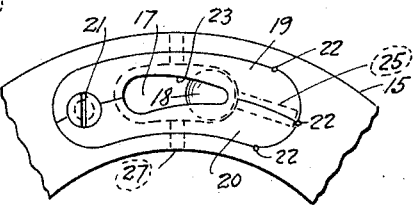
Figure 2 is a fragmentary plan view taken substantially on the line 2—2 of Figure 1.
Figure 3:
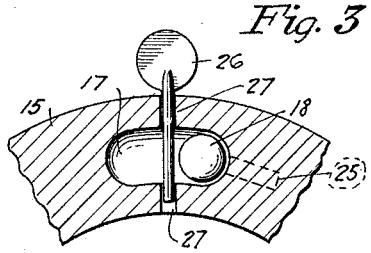
Figure 5:
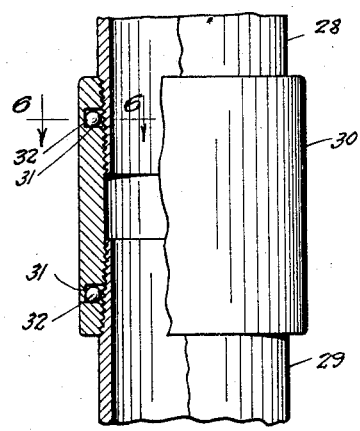
Figure 4:
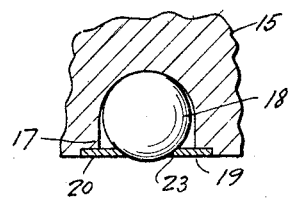

Figures 3 and 4 are fragmentary sectional views taken on the lines 3—3 and 4—4, respectively, of Figure 1;

Figure 5 is a view partly in section showing another form of locking device embodying my invention.

Figure 6:
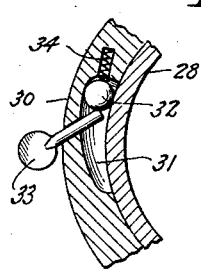

Figure 6 is a fragmentary sectional view taken on the line 6—6 of Figure 5.

Similar reference characters refer to similar parts in each of the several views.

Referring specifically to the drawings and particularly to Figure 1, I have here shown a pipe or rod coupling including the meeting ends of two sections of pipe or rod 15 and 16, the section 15 being provided with a tapered socket 15$^a$, and section 16 being formed with a tapered extension or head 16$^a$. The walls of the head and socket are screw threaded to provide a connection between the two sections of pipe to form the coupling.

The locking device forming the subject matter of my invention, includes the formation of a pocket 17 in the confronting end of one of the sections 15 or 16. In the present instance, I have shown the pocket formed on the end of section 15, and this pocket is tapered in depth from one end to the other, so that the pitch of its longitudinal axis, although being in the same direction, is slightly greater than the pitch of the screw threads of the head and socket 15$^a$ and 16$^a$. Within the pocket 17 works a ball 16 or other suitable element formed of metal or an equivalent material and confined within the pocket by means of a plate including sections 19 and 20. These plate sections are countersunk in the edge or end of section 15, so as to lie flush with such edge and thereby permit the meeting of the confronting ends of sections 15 and 16. The plate is secured in spanning relation to the pocket by means of a screw 21 and retaining lips 22 formed on the edge of the pocket by striking the section with a centerpunch. The two sections of the plate are constructed to provide a tapered opening or slot 23, the wide end of the slot permitting the ball 18 to project therefrom for engagement with the edge of the section 16, as is clearly illustrated in Figures 1 and 4. It will be noted that the wide end of the slot 23 is adjacent the narrow end of the pocket so that when the ball 18 is in the narrow end of the pocket it will project through the opening the greatest distance of which it is capable.

In the normal position of the ball 18 it is slightly urged in the direction of the narrow end of the pocket by means of an expansible spring 24, disposed within a suitable recess 25, which communicates with the pocket. This spring insures constant contact of the ball with the coupling section at all times when they are in the connected position.

In practice, the two sections of pipe or rod 15 and 16 can be connected or coupled by screwing the head 16ª into the socket 15ª, until the confronting ends or faces of the sections are in contact with each other. If, during this screwing operation, the ball 18 is in the lower end of the pocket 17, it will be engaged by the face of the section 16 and rotated to the deep end of the pocket where it engages the spring 24. It will be understood that because of the spring 24 the ball will continue to rotate without binding as long as the section 16 is rotated. It will thus be seen that the ball in no way restricts the coupling of the sections. However, should there be any movement of either section 15 or 16 in a direction which would effect uncoupling of the sections, the ball being in engagement with both of the confronting faces will be moved toward the narrow end of the pocket 17, thus sufficiently projecting the ball from the pocket to effect binding engagement with the edge of the section 16, and thereby locking the sections against movement. Further rotation of the sections is thus checked so that the uncoupling of the sections is positively prevented.

When it is desired to uncouple the sections with the ball 18 in the released position shown in Figure 1, a key 26 may be extended into the pocket 17, through openings 27, so as to prevent movement of the ball to the narrow end of the pocket. It will be clear that by maintaining the ball in the deep end of the pocket, the sections 15 and 16 can be freely rotated to effect an uncoupling of the sections.

Referring now to Figures 5 and 6, I have here shown another conventional form of pipe or rod coupling including sections 28 and 29, connected by a collar or sleeve 30, which threadedly engages the confronting ends of the sections. This sleeve or collar 30 is provided with pockets 31, constructed in a manner similar to pocket 17, and in each pocket is disposed a ball 32, which operates when attempting to unscrew the collar or sections to effect a binding engagement with the threads of the sections and the collar, thereby locking the collar or sections against unscrewing movement and thereby preventing uncoupling of the sections.

It is clearly shown in Figure 6 that the ball 32 can be retained in non-binding position by a key 33 extending into the pocket through a suitable opening. As in the first form of my invention, the ball 32 is engaged by spring 34, which tends to always keep the ball in contact with the opposing faces.

In order to exclude from the pockets 17 and 31 sand, mud, and water, and thus prevent clogging of the balls in their locking action with respect to the sections of the couplings, I pack into the pockets vaseline or heavy grease of any character, thereby sealing the pockets and thus insuring proper operation of the balls at all times.

Although I herein show and describe only two forms of locking devices of couplings embodying my invention, it is to be understood that various changes and modifications may be made herein without departing from the spirit of the invention and the spirit and scope of the appended claims.

What I claim is:

1. In combination, a pipe or rod coupling including screw threaded elements, a pocket formed in one of the elements, the pitch of the longitudinal axis of said pocket being slightly greater than the pitch of the threads of said elements, and a member rotatable in the pocket and arranged to engage the other element so that when either element is rotated to effect an uncoupling of the elements, the member will cause binding engagement between the elements to prevent uncoupling thereof.

2. In combination, a pipe or rod coupling including rotatable elements in coupling relation to each other, a tapered pocket in the coupling end of one of the elements, a cover plate for the pocket having a tapered opening therein, and a ball confined in the pocket by said plate to project through said opening for engagement with the coupling end of the other element in the manner and for the purpose described.

3. In combination, a pipe or rod coupling including rotatable elements in coupling relation to each other, a tapered pocket in the coupling end of one of the elements, a cover plate for the pocket having a tapered opening therein, and a ball confined in the pocket by said plate to project through said opening for engagement with the coupling end of the other element, that element having the pocket being formed with an opening through which a key can be extended to the pocket for retaining the ball in the deep end of the pocket for the purpose described.

FRANK SUMNER BUNKER.